D'ARCY V. T. A. LOCKE.
VALVE OF INTERNAL COMBUSTION ENGINES.
APPLICATION FILED NOV. 12, 1909.
963,600.
Patented July 5, 1910.
2 SHEETS—SHEET 1.
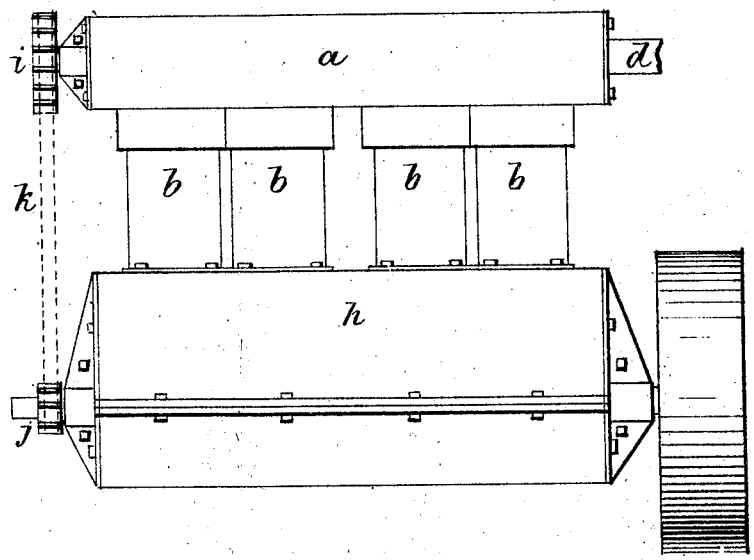
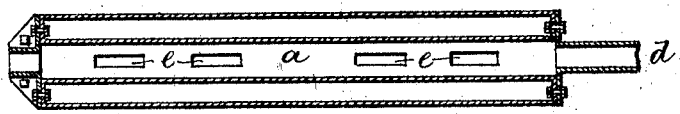
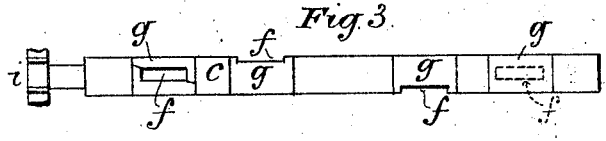
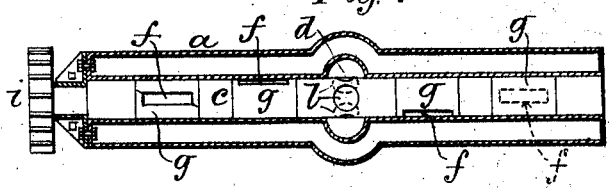
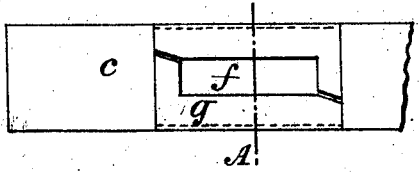
Witnesses:
Inventor
D'Arcy Victor Thomas Andrews Locke D'ARCY V. T. A. LOCKE.
VALVE OF INTERNAL COMBUSTION ENGINES.
APPLICATION FILED NOV. 12, 1909.
963,600.
Patented July 5, 1910.
2 SHEETS—SHEET 2.
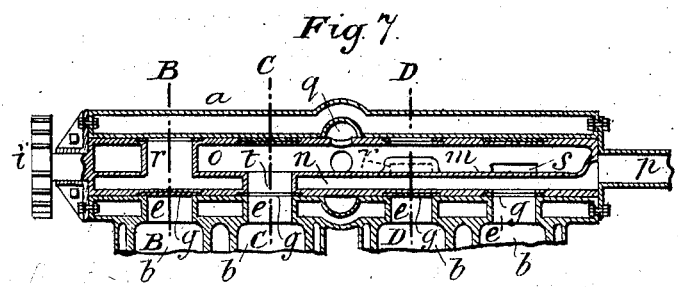
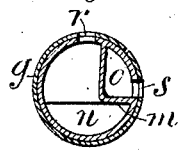
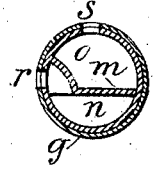

UNITED STATES PATENT OFFICE.

D'ARCY VICTOR THOMAS ANDREWS LOCKE, OF SOUTHBOURNE, ENGLAND, ASSIGNOR TO EDWIN JAMES CASTIGLIONE, OF CARLISLE, ENGLAND, AND FRANCIS CHENEY BOLTON, OF WANDALES, WETHERAL, ENGLAND.

VALVE OF INTERNAL-COMBUSTION ENGINES.

963,600.

Specification of Letters Patent. Patented July 5, 1910.

Application filed November 12, 1909. Serial No. 527,685.

*To all whom it may concern:*

Be it known that I, D'ARCY VICTOR THOMAS ANDREWS LOCKE, residing at Southbourne, England, have invented new and useful Improvements in the Valves of Internal-Combustion Engines, of which the following is a specification.

The said invention relates to those valves of internal combustion engines working on the Otto cycle which are tubular and rotatably mounted within a chamber and have circumferential admission and exhaust ports in communication with the inlet and exhaust and also communicating from time to time with the cylinder or cylinders of the engine during its working and the objects of the said invention are to prevent escape of gases between the said valve and chamber and to avoid friction in the working of the valve notwithstanding unequal expansion of the valve and chamber consequent on variation of temperature within the valve.

According to the said invention the mouths of the admission and exhaust ports in the valve are formed in a split spring ring or split spring rings surrounding the body of the valve at the part or parts where the ports are situated and so connected to the valve as to rotate with it. Where one valve is used for both the inlet and the exhaust it is divided longitudinally inside into two chambers by means of a web between the ports.

Means may be provided for moving the valve endwise in order to increase or decrease the effective size of the ports and thereby act as a throttle or accelerator to the engine.

Figure 1 of the accompanying drawings is a side elevation of an internal combustion engine of the vertical four cylinder type embodying the said invention. Fig. 2 is a longitudinal section of one of the valve chambers of the engine Fig. 1. Fig. 3 is a side view of one of the valves of the engine Fig.
1. Fig. 4 is a longitudinal section of one of the valve chambers and its valve constructed according to a modification. Fig. 5 is a side view of a portion of the valve and Fig. 6 is a section thereof taken on the line A A Fig. 5. Fig. 7 is a longitudinal section of the valve and its chamber when the valve is provided with a web as and for the purpose hereinbefore described. Figs. 8, 9 and 10 are sections of the valve, Fig. 7 alone taken respectively on the lines B B, C C and D D Fig. 7. Figs. 5, 6, 8, 9 and 10 are drawn to larger scale than the other figures.

In the following description the parts of the said figures are referred to by the letters marked thereon, the same letters of reference indicating the same or equivalent parts in all the figures.

Referring to Figs. 1 to 6, $a$ is the valve containing chamber common to all the cylinders $b\ b$ and $c$ is one of the valves of which there are two one being for admission and one for exhaust. $d$ is the gas inlet or exhaust as the case may be. $e\ e$ are ports between the cylinders $b\ b$ and the chamber $a$. $f\ f$ are ports in the valve shell coinciding from time to time with the ports $e\ e$ during rotation of the valve whereby gas is admitted to or exhausted from the cylinders $b\ b$ through the interior of the valve $c$ in due order of firing. At the parts of the valve $c$ where the ports are situated it is circumferentially recessed and in the recesses are mounted the split spring rings $g\ g$ having formed in them apertures constituting the mouths of the valve ports $f\ f$. $h$ is the crank case and $i\ j$ are chain wheels and $k$ is a driving chain whereby the valve is rotated at half the speed of the crank shaft.

In the construction Fig. 4 the gas inlet or exhaust $d$ is arranged in the side of the chamber $a$ and is always in communication with the interior of the valve $c$ by means of the ports $l\ l$ in it.

In the construction Figs. 7, 8, 9 and 10 the interior of the valve is divided by a longitudinal web $m$ into two chambers $n$, $o$ respectively communicating with the end inlet $p$ and the central exhaust $q$ which web $m$ is formed so that the admission ports $r\ r$ of the valve open into the chamber $n$ which is in communication with the inlet and so that the exhaust ports $s\ t$ are in communication with the chamber $o$ which is in communication with the exhaust.

As shown in Figs. 7 and 9 the exhaust port $t$ communicates with the chamber $o$ by means of a passage crossing the inlet chamber $n$. In this construction each of the split spring rings $g\ g$ has two ports cut in it coinciding respectively with the valve inlet and exhaust ports for each cylinder the splits of the said rings being between the ports in them as shown in Figs. 8, 9 and 10.

By the construction hereinbefore described the necessary gas tight fit between the valve and its casing at and near the ports is insured notwithstanding differences of expansion thereof the elasticity of the port rings $g$ $g$ keeping their outer faces always in contact with the valve casing without undue pressure.

I claim:—

1. A rotatory internal combustion engine valve consisting essentially of a radially ported tube and fitted at its ported parts with surrounding split spring rings rotating with it and having ports coincident with the valve ports for the purpose hereinbefore described.

2. A rotatory internal combustion engine valve consisting essentially of a tube the interior of which is divided by a longitudinal web into two chambers respectively communicating with the inlet and exhaust and having radial inlet and exhaust ports respectively which tube is fitted at its ported parts with surrounding split spring rings rotating with it and having ports coincident with the tube ports for the purpose hereinbefore described.

D'ARCY VICTOR THOMAS ANDREWS LOCKE.

Witnesses:
RAOUL THOMPSON,
SAMUEL ALLEYNE.